(12) United States Patent
Roh et al.

(10) Patent No.: US 7,609,341 B2
(45) Date of Patent: Oct. 27, 2009

(54) COMMON ELECTRODE PANEL, MANUFACTURING METHOD THEREOF, AND LIQUID CRYSTAL DISPLAY INCLUDING THE PANEL

(75) Inventors: Nam-Seok Roh, Seongnam-si (KR);
Jeong-Ye Choi, Hwaseong-si (KR);
Jae-Hyuk Chang, Seoul (KR);
Young-Chol Yang, Seongnam-si (KR);
Mun-Pyo Hong, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 342 days.

(21) Appl. No.: 11/454,282

(22) Filed: Jun. 16, 2006

(65) Prior Publication Data

US 2007/0019142 A1 Jan. 25, 2007

(30) Foreign Application Priority Data

Jul. 19, 2005 (KR) .................... 10-2005-0065255

(51) Int. Cl.
*G02F 1/1335* (2006.01)
(52) U.S. Cl. .................... 349/108; 349/106; 349/114
(58) Field of Classification Search .................... None
See application file for complete search history.

(56) References Cited

U.S. PATENT DOCUMENTS

2002/0113927 A1    8/2002  Ha et al.
2003/0104291 A1*  6/2003  Yi et al. .................... 430/7
2003/0122998 A1   7/2003  Iijima et al.
2004/0169793 A1   9/2004  Ino et al.
2004/0233359 A1* 11/2004  Nam et al. .................... 349/114
2005/0053852 A1   3/2005  Cheng
2006/0187391 A1*  8/2006  Hwang .................... 349/114
2009/0103022 A1*  4/2009  Roh et al. .................... 349/106

FOREIGN PATENT DOCUMENTS

JP    2005157103    6/2005
WO    2004055581    7/2004

* cited by examiner

*Primary Examiner*—Michelle R Connelly Cushwa
(74) *Attorney, Agent, or Firm*—Cantor Colburn LLP

(57) ABSTRACT

A liquid crystal display includes a common electrode panel having a first substrate, a color filter formed on the substrate and having a light hole, a common electrode formed on the color filter and into the light hole, a first insulating film formed on the common electrode and formed into the light hole, a thin film transistor (TFT) panel facing the common electrode panel, and a liquid crystal layer interposed between the common electrode panel and the TFT panel. The TFT panel includes a second substrate, a transmissive electrode formed on the second substrate, and a reflective electrode formed on the second substrate and connected to the transmissive electrode.

21 Claims, 22 Drawing Sheets

# COMMON ELECTRODE PANEL, MANUFACTURING METHOD THEREOF, AND LIQUID CRYSTAL DISPLAY INCLUDING THE PANEL

The present application claims priority to Korean Patent Application No. 2005-0065255, filed on Jul. 19, 2005, and all the benefits accruing therefrom under 35 U.S.C. §119, and the contents of which in its entirety are herein incorporated herein by reference.

BACKGROUND OF THE INVENTION (a) Field of the Invention

The present invention relates to a common electrode panel, a manufacturing method thereof, and a liquid crystal display ("LCD") having the common electrode panel, and more particularly to a transflective common electrode panel, a manufacturing method thereof, and an LCD having the transflective common electrode panel.

(b) Description of the Related Art

LCDs are one of the most widely used flat panel displays. An LCD includes a liquid crystal ("LC") layer interposed between two panels each provided with field-generating electrodes. The LCD displays images by applying voltages to the field-generating electrodes to generate an electric field in the LC layer that determines orientations of LC molecules in the LC layer to adjust a polarization of incident light on the LC layer. The incident light having adjusted polarization is either intercepted or allowed to pass by a polarizing film, thereby displaying images.

LCDs are classified as either a transmissive LCD or a reflective LCD depending on the light source used by the LCD. The light source of the transmissive LCD is a backlight. The light source of the reflective LCD is external light. The reflective type of LCD is usually implemented in small or medium sized display devices.

A transflective LCD has been under development. The transflective LCD uses both a backlight and an external light as the light sources depending on circumstances, and is also usually implemented in small or medium sized display devices. The trans-reflective LCD includes a transmissive region and a reflective region in each pixel. While light passes through an LC layer only once in the transmissive region, light passes through the LC layer twice in the reflective region. Accordingly, gamma curves of the transmissive region and the reflective region are not coincident, and images are displayed differently in the transmissive region and the reflective region.

To solve this problem, the LC layer may be formed to have two different thicknesses (cell gaps) between the transmissive region and the reflective region. Alternatively, the trans-reflective LCD may be driven by two different driving voltages depending on whether the LCD is in a transmissive mode or a reflective mode.

However, when the two cell gap structure is applied, a thicker layer is required to be formed on the reflective region, thereby complicating the manufacturing process. Furthermore, since a high step is formed between the transmissive region and the reflective region, the LC molecules are aligned in a disorderly manner around the high step, thereby causing disclination in an image. Also, brightness reversion may occur in a high voltage range. On the other hand, when the method of applying two different driving voltages is used to solve the problem, gamma curves cannot be coincident due to the inconsistency between critical voltages for transmissive brightness and reflective brightness.

BRIEF SUMMARY OF THE INVENTION

A motivation of the present invention is to solve the problems of the conventional techniques discussed above.

In an exemplary embodiment of the present invention, a common electrode panel is provided including a substrate, color filters formed on the substrate, each of the color filters having a light hole, a common electrode formed on the color filters and into each of the light holes, and a first insulating film formed on the common electrode and formed into the light holes.

The light hole may be divided into two regions, and the first insulating film may be formed on one of the two regions.

The common electrode panel may further include a second insulating film formed into each of the light holes and wherein the common electrode may be formed on the second insulating film in at least the other of the two regions.

The first and second insulating films may include an area ratio of 0.4:0.6 to 0.6:0.4.

The color filters may include a transparent color filter formed along with the second insulating film.

The second insulating film and the transparent color filter may be formed by a negative photoresist.

The color filters may represent one of at least three colors or may be transparent.

The light holes of the color filters representing the at least three colors may be each of different sizes.

The common electrode panel may further include an elastic spacer formed on the common electrode.

The elastic spacer may be formed along with the first insulating films and may extend from the common electrode to a thin film transistor (TFT) panel facing the common electrode panel.

In a further embodiment of the present invention, a liquid crystal display is provided including a common electrode panel having a first substrate, a color filter formed on the substrate and having a light hole, a common electrode formed on the color filter and into the light hole, and a first insulating film formed on the common electrode formed into the light hole, a thin film transistor (TFT) panel facing the common electrode panel, and a liquid crystal layer interposed between the common electrode panel and the TFT panel, wherein the TFT panel includes a second substrate, a transmissive electrode formed on the second substrate, and a reflective electrode formed on the second substrate and connected to the transmissive electrode.

The light hole may be formed over the reflective electrode.

The common electrode formed into the light hole and the reflective electrode may have an interval therebetween that is larger than that between the common electrode and the reflective electrode formed on the color filter.

The reflective electrode may be formed on the transmissive electrode and may have an embossed curved surface.

In a still further embodiment of the present invention, liquid crystal display comprising a plurality of pixels is provided, each pixel include a transmissive liquid crystal (LC) capacitor, first and second reflective LC capacitors connected to the transmissive LC capacitor, and an auxiliary capacitor connected in series to the second reflective LC capacitor, wherein a voltage across the second reflective LC capacitor is smaller than that across of the first reflective LC capacitor.

The auxiliary capacitor may be connected to the transmissive LC capacitor and the first reflective LC capacitor via the second reflective LC capacitor.

The liquid crystal display may further include a storage capacitor connected to the transmissive LC capacitor and the first and second LC reflective capacitors.

The liquid crystal display may further include a switching element connected to the transmissive LC capacitor and the first and second LC reflective capacitors.

The transmissive LC capacitor may include a transmissive electrode connected to the switching element, and the first and second reflective LC capacitors comprise the reflective electrode connected to the switching element.

The transmissive LC capacitor, the first reflective LC capacitor, and the auxiliary capacitor may include a common electrode that is supplied with a common voltage.

The transmissive LC capacitor and the first and second reflective LC capacitors may include a liquid crystal layer.

The auxiliary capacitor may include an insulating film formed between the common electrode and the liquid crystal layer.

The voltage across the first reflective LC capacitor and the voltage across the second reflective LC capacitor may have a voltage ratio of about 1.0:0.6 to about 1.0:0.9.

In a still further embodiment of the present invention, a manufacturing method of a common electrode panel of a transflective liquid crystal display is provided including forming a light blocking member on a substrate, forming color filters on the substrate, forming light holes in the color filters, forming a common electrode on the color filters and into the light holes, and forming first insulating films on the common electrode and into the light holes.

The light hole may be divided into two regions, and the first insulating films are formed on one of the two regions.

The formation of the common electrode may further include forming second insulating films into the light holes and forming the common electrode on the second insulating films.

The formation of the first insulating films may include forming an elastic spacer on the common electrode along with forming the first insulating films, wherein the elastic spacer extends from the common electrode to a thin film transistor (TFT) panel facing the common electrode panel.

The formation of the color filters and the light holes may include sequentially forming color filters representing at least three colors, and light holes, and forming the second insulating films into the light holes along with the formation of a transparent color filter.

The transparent color filter and the second insulating films may be formed by a negative photoresist.

BRIEF DESCRIPTION OF THE DRAWINGS

The accompanying drawings are included to provide further understanding of the present invention and are incorporated in and constitute a part of this specification in which.

DETAILED DESCRIPTION OF THE INVENTION

Figure 1:
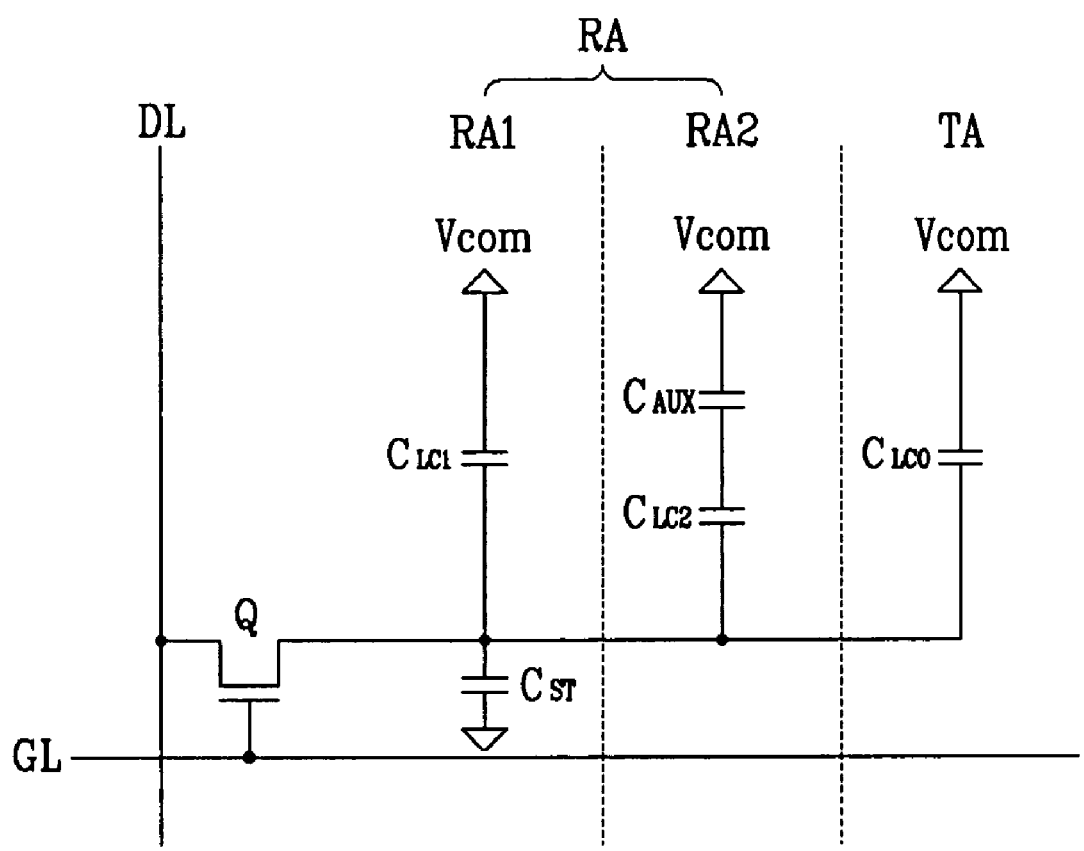
FIG. 1 is an equivalent circuit schematic diagram of an exemplary embodiment of an LCD according to the present invention.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Exemplary embodiments of the present invention will be described more fully hereinafter with reference to the accompanying drawings, in which exemplary embodiments of the present invention are shown. The present invention may, however, be embodied in many different forms and should not be construed as being limited to the exemplary embodiments set forth herein. Rather, these exemplary embodiments are provided so that this disclosure will be thorough and complete, and will fully convey the scope of the present invention to those skilled in the art.

Figure 2:
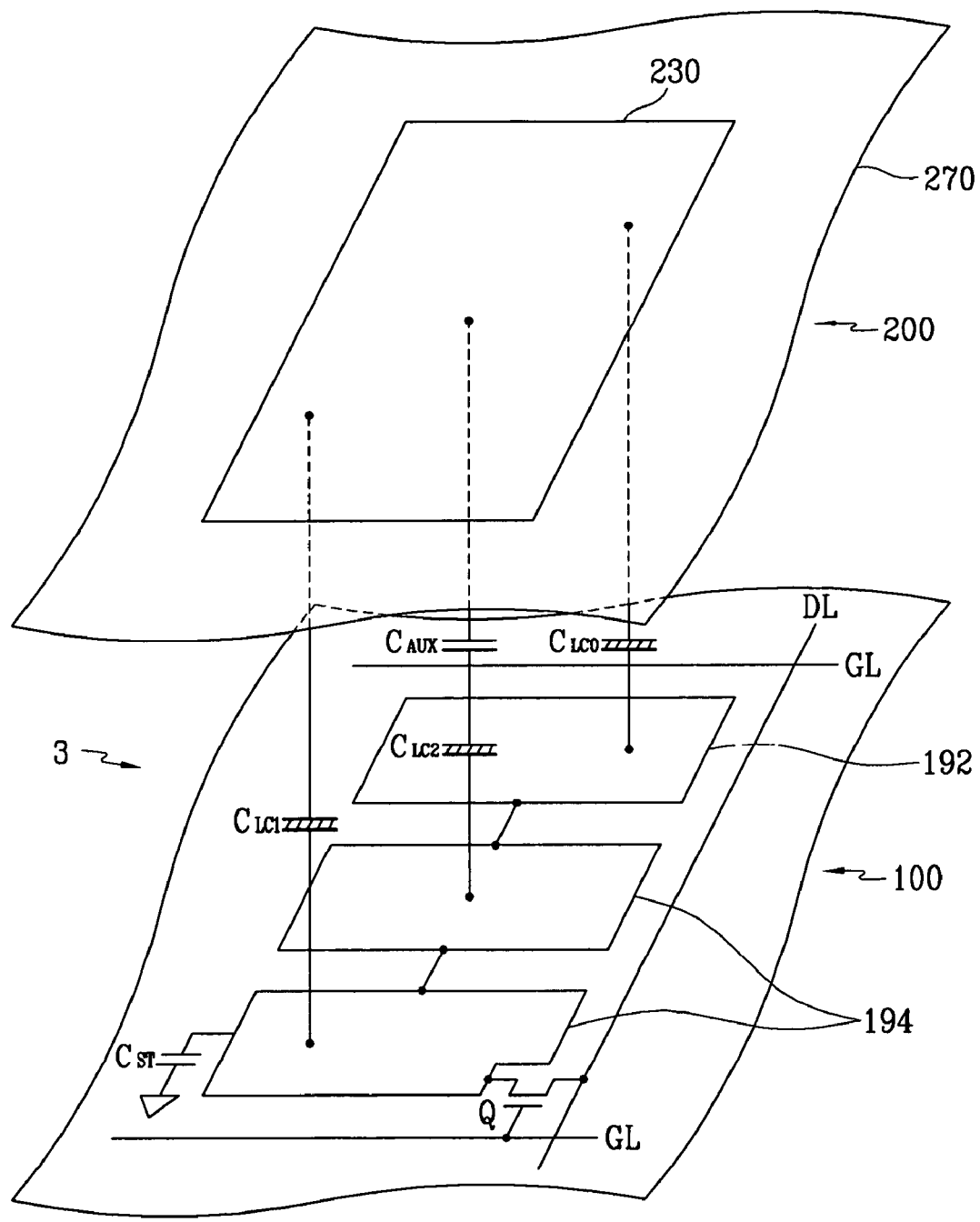
FIG. 2 is an equivalent circuit schematic diagram of an exemplary embodiment of a pixel of an LCD according to the present invention.

FIG. 1 is an equivalent circuit schematic diagram of an exemplary embodiment of an LCD according to the present invention. FIG. 2 is an equivalent circuit schematic diagram of an exemplary embodiment of a pixel of an LCD according to the present invention.

An exemplary embodiment of an LCD according to the present invention includes a plurality of display signal lines GL and DL, and a plurality of pixels each connected thereto and arranged substantially in a matrix format as partially shown in the circuit schematics of FIGS. 1 and 2. In addition, the LCD includes a TFT array panel 100, a common electrode panel 200 facing the TFT array panel 100 and a liquid crystal layer 3 interposed between the two panels 100 and 200.

The display signal lines GL and DL are provided on the TFT array panel 100 and include a plurality of gate lines GL for transmitting gate signals (also referred to as "scanning signals"), and a plurality of data lines DL for transmitting data signals. The gate lines GL extend substantially in a row direction and are substantially parallel to each other, while the data lines DL extend substantially in a column direction and are substantially parallel to each other, as illustrated in FIGS. 1 and 2.

Each pixel includes a switching element Q connected to the gate lines GL and the data lines DL, a transmissive LC capacitor $C_{LC0}$, the first reflective LC capacitor $C_{LC1}$, a second reflective LC capacitor $C_{LC2}$, a storage capacitor $C_{ST}$, and an auxiliary capacitor $C_{AUX}$ connected to the second reflective LC capacitor $C_{LC2}$. However, it should be noted that the storage capacitor $C_{ST}$ may be omitted.

The switching element Q, such as a TFT, is provided on the TFT array panel 100 and has three terminals: a control terminal connected to one of the gate lines GL; an input terminal connected to one of the data lines DL; and an output terminal connected to the transmissive LC capacitor $C_{LC0}$, the first reflective LC capacitor $C_{LC1}$, the second reflective LC capacitor $C_{LC2}$, and the storage capacitor $C_{ST}$.

Referring to FIG. 2, the transmissive LC capacitor $C_{LC0}$ includes a transmissive electrode 192 provided on the TFT array panel 100 and a common electrode 270 provided on the common electrode panel 200, as two terminals. The LC layer 3 disposed between the two electrodes 192 and 270 functions as a dielectric of the transmissive LC capacitor $C_{LC0}$. The transmissive electrode 192 is connected to the switching element Q, and the common electrode 270 is supplied with a common voltage Vcom and covers an entire surface of the common electrode panel 200. Unlike in FIG. 2, the common electrode 270 may be provided on the TFT array panel 100, and both electrodes 192 and 270 may have shapes of bars or stripes.

The first and second reflective LC capacitors $C_{LC1}$ and $C_{LC2}$, respectively, include a reflective electrode 194 provided on the TFT array panel 100 and the common electrode 270 as two terminals. The LC layer 3 disposed between the two electrodes 194 and 270 functions as a dielectric of the first and second reflective LC capacitors $C_{LC1}$ and $C_{LC2}$. The reflective electrodes 194 are connected to the switching element Q.

The second reflective LC capacitor $C_{LC2}$ and the auxiliary capacitor $C_{AUX}$ connected thereto in series include the reflective electrode 194 provided on the TFT array panel 100 and the common electrode 270, as two terminals. The LC layer 3 and an insulating layer (not shown) disposed between the two electrodes 194 and 270 function as dielectrics of the second reflective LC capacitor $C_{LC2}$ and the auxiliary capacitor $C_{AUX}$. The auxiliary capacitor $C_{AUX}$ divides a voltage from the switching element Q along with the second reflective LC capacitor $C_{LC2}$, and thereby a voltage applied across the second reflective LC capacitor $C_{LC2}$ is smaller than that across the first reflective LC capacitor $C_{LC1}$.

The transmissive electrode 192 is made of a transparent conducting material and includes a portion covered by the reflective electrode 194 and an exposed portion without the reflective electrode 194. The reflective electrodes 194 are made of an opaque reflective conducting material. An exemplary embodiment of a transflective LCD according to the present invention includes a plurality of transmissive regions TA and a plurality of reflective regions RA defined by the transmissive electrodes 192 and the reflective electrodes 194, respectively. In detail, areas disposed under and over an exposed portion of a transmissive electrode 192 are to be a transmissive region TA, and areas disposed under and over a reflective electrode 194 are to be a reflective region RA. The reflective region RA is divided into first and second reflective regions RA1 and RA2 defined by the first and second reflective LC capacitors $C_{LC1}$ and $C_{LC2}$, respectively (see FIG. 1).

In the transmissive regions TA, light from a backlight unit (not shown) disposed under the TFT array panel 100 passes through the LC layer 3 to display desired images. In the reflective regions RA, external light such as sunlight or ambient light that is incident thereon passes through the common electrode panel 200 and the LC layer 3 to reach the reflective electrodes 194. Then, the external light is reflected by the reflective electrodes 194 and passes through the LC layer 3 again.

The storage capacitor $C_{ST}$ is an auxiliary capacitor for the LC capacitors $C_{LC0}$, $C_{LC1}$, and $C_{LC2}$. The storage capacitor $C_{ST}$ includes the transmissive electrode 192 or the reflective electrode 194 and a storage electrode (not shown), which is provided on the TFT array panel 100. The storage capacitor $C_{ST}$ overlaps the transmissive electrode 192 or the first reflective electrode 194 via an insulator, and is supplied with a predetermined voltage such as a common voltage Vcom. Alternatively, the storage capacitor $C_{ST}$ includes the transmissive electrode 192 or the reflective electrode 194 and an adjacent gate line called a previous gate line, which overlaps the transmissive electrode 192 or the reflective electrode 194 via an insulator.

For color display, each pixel uniquely represents one of three colors (i.e., spatial division), or each pixel sequentially represents the three colors in turn (i.e., temporal division) such that a spatial or temporal sum of the three colors is recognized as a desired color. An example of a set of the three colors includes red, green, and blue colors and may also include primary colors. FIG. 2 shows an example of the spatial division in which each pixel includes a color filter 230 representing one of the three colors in an area of the upper panel 200 facing the transmissive and reflective electrodes 192 and 194. Alternatively, the color filter 230 is provided on or under the transmissive and reflective electrodes 192 and 194 on the lower panel 100.

Next, the schematic layered structures of an exemplary embodiment of an LCD according to the present invention will now be described with reference to FIGS. 3 and 4.

Figure 3:
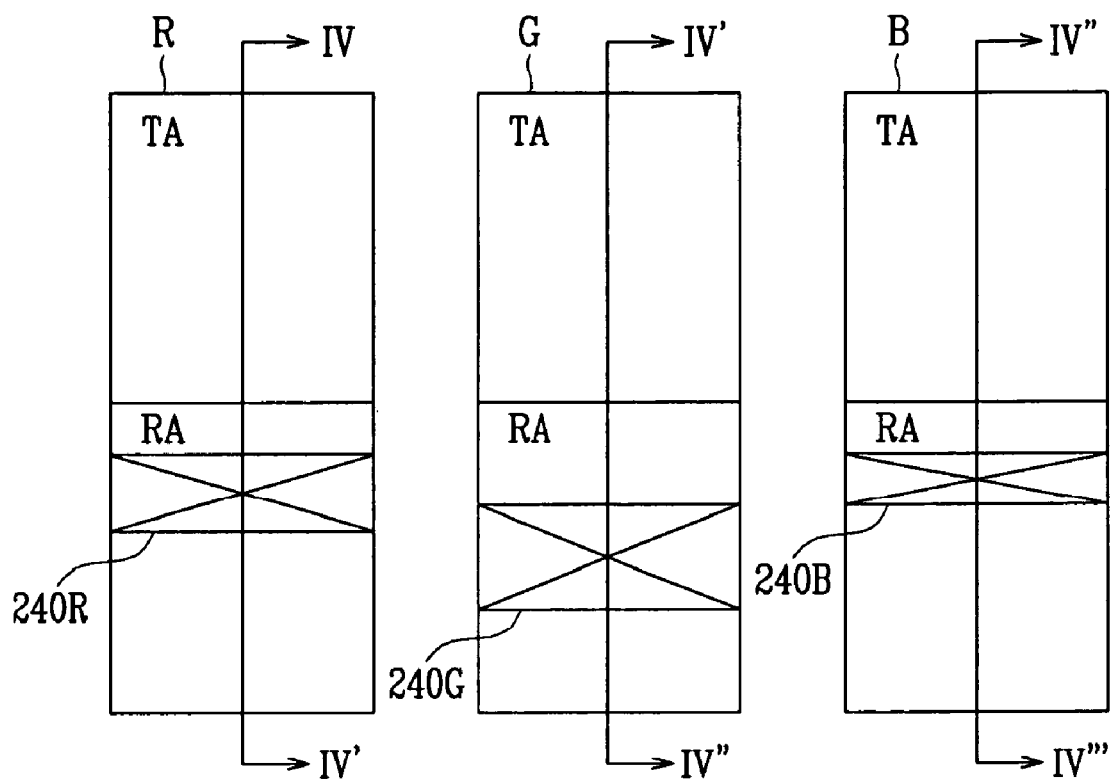
FIG. 3 is a schematic plan view of an exemplary embodiment of an LCD according to the present invention.
Figure 4:
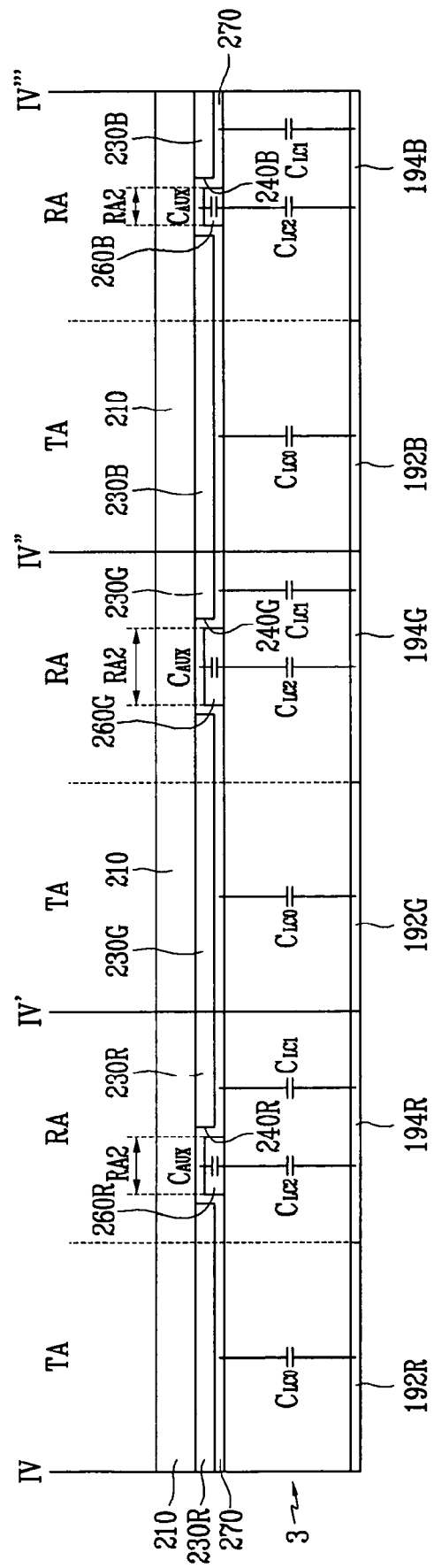
FIG. 4 is a cross-sectional view taken along the lines IV-IV', IV'-IV", and IV"-IV'" of FIG. 3.

FIG. 3 is a schematic plan view of an exemplary embodiment of an LCD according to the present invention and FIG. 4 is a cross-sectional view taken along the lines IV-IV', IV'-IV'', and IV''-IV''' of FIG. 3.

As best shown in FIG. 4, the LCD includes a TFT array panel, a common electrode panel facing the TFT array panel, and an LC layer 3 interposed therebetween and having LC molecules, as well as a plurality of pixels. The pixels includes pixels representing red (referred to as "R pixels"), pixels representing green (referred to as "G pixels") and pixels representing blue (referred to as "B pixels").

In the drawings, reference characters R, G and B are added to respective reference numerals for distinguishing R, G B pixels, but, for convenience of explanation, the reference characters R, G, and B are omitted in cases where there is no need to distinguish the R, G and B pixels.

The TFT array panel includes a plurality of switching elements (not shown), a plurality of transmissive electrodes 192R, 192G and 192B, and a plurality of reflective electrodes 194R, 194G and 194B formed on an insulating substrate (not shown).

The area ratios of the transmissive electrode 192 and the reflective electrode 194 within the R, G and B pixels, respectively are substantially equal to each other, and the transmissive area TA and the reflective area RA are defined by the transmissive electrode 192 and the reflective electrode 194, respectively.

The common electrode panel includes a plurality of color filters 230R, 230G and 230B formed on an insulating substrate 210.

Each color filter 230 formed on the reflective region RA of each pixel includes an opening, that is, a light hole 240R, 240G and 240B for adjusting color tone of the reflective region RA. The light hole 240 may have a rectangular shape or a circular shape. The size of the light hole 240G formed in the green color filter 230G is the largest, and the size of the light hole 240B formed in the blue color filter 230B is the smallest.

A common electrode 270 is formed on the color filters 230 and into the light holes 240.

An organic insulating layer 260R, 260G and 260B is formed on the common electrode 270 and into the light holes 240. The organic insulating layer 260 provides a flat surface by filling in the light holes 240, and functions as a dielectric of the auxiliary capacitor $C_{AUX}$. A dielectric constant and a height of the organic insulating layer 260 may be determined by the capacitance ratio of the second reflective LC capacitor $C_{LC2}$ and the auxiliary capacitor $C_{AUX}$.

The second reflective region RA2 is located at portions corresponding to under and over the light holes 240 of the reflective region RA, and the first reflective region RA1 is the remaining portions excluding the second reflective region RA2 of the reflective region RA.

Referring to FIG. 4, a distance between the transmissive electrode 192 and the common electrode 270 in the transmissive region TA and a distance between the reflective electrode 194 and the common electrode 270 in the first reflective region RA1 are substantially equal to each other, but a distance between the reflective electrode 194 and the common electrode 270 in the second reflective region RA2 is different therefrom. The two layers (of capacitors e.g., the auxiliary capacitor $C_{AUX}$ and the second reflective LC capacitor $C_{LC2}$) have different dielectric constants from each other and overlap between the common electrode 270 and the reflective electrode 194 in the second reflective region RA2, to form the auxiliary capacitor $C_{AUX}$ and the second reflective LC capacitor $C_{LC2}$.

A difference between voltages applied to the transmissive electrode 192, the reflective electrode 194 and the common electrode 270 is the same for each, and thereby the second reflective LC capacitor $C_{LC2}$ and the auxiliary capacitor $C_{AUX}$ divide the applied voltage. A voltage across the second reflective LC capacitor $C_{LC2}$ is smaller than that across the transmissive LC capacitor $C_{L0}$ and across the first reflective LC capacitor $C_{LC1}$.

When a data voltage corresponding to an image signal is applied to the transmissive electrode 192 and the reflective electrode 194 through the switching element Q, a voltage difference V (e.g., a pixel voltage) between the data voltage and the common voltage Vcom is formed between the two terminals of the transmissive LC capacitor $C_{LC0}$ and the first reflective LC capacitor $C_{LC1}$. However, a voltage V2 that is smaller than the pixel voltage V is applied across the second reflective LC capacitor $C_{LC2}$ due to the auxiliary capacitor $C_{AUX}$ and is described by the following Equation 1.

$$V2 = \frac{C_{AUX}}{(C_{AUX} + C_{LC2})} V = k_{iv} V \quad \text{[Equation 1][}$$

Here, each of the capacitors $C_{AUX}$ and $C_{LC2}$ and the capacitances thereof are denoted by the same reference characters, and k is a voltage ratio of a voltage across the first reflective LC capacitor $C_{LC1}$ and a voltage across the second reflective LC capacitor $C_{LC2}$.

The R, G and B pixels are arranged in a stripe shape (e.g., linearly aligned), but may be arranged in various shapes such as a delta shape or a mosaic shape. The order of the R, G and B pixels may be varied, and the sizes of the R, G and B pixels may be different from each other.

Now, the structures of an exemplary embodiment of an LCD according to the present invention will now be described with reference to FIGS. 5 to 7.

Figure 5:
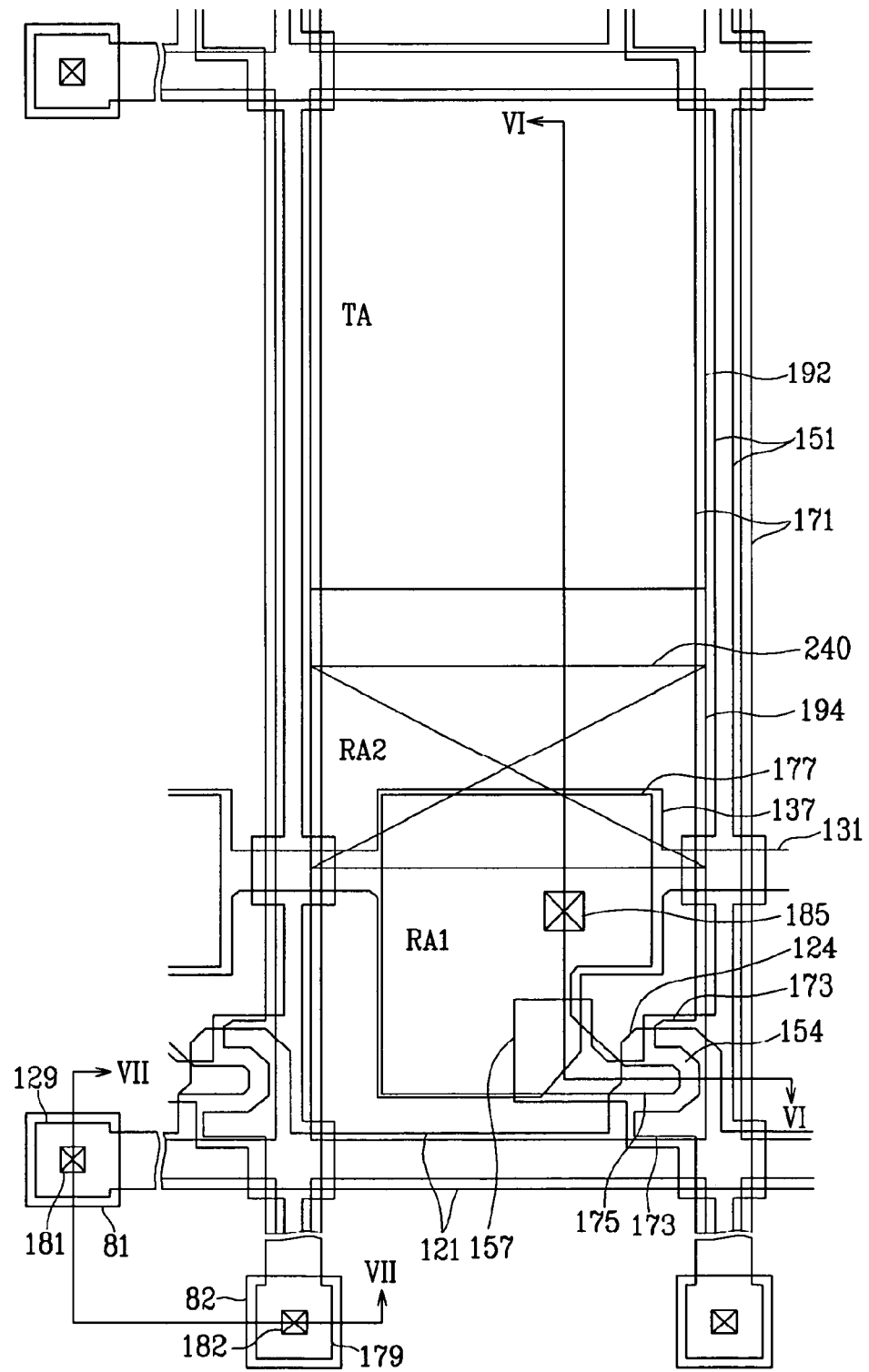
FIG. 5 is a plan view illustrating a layout of an exemplary embodiment of an LCD according to the present invention.

FIG. 5 is a plan view illustrating a layout of an exemplary embodiment of an LCD according to the present invention. FIGS. 6 and 7 are cross-sectional views taken along the lines VI-VI and VII-VII of FIG. 5, respectively.

An exemplary embodiment of an LCD according to the present invention includes a TFT array panel 100, a common electrode panel 200 facing the TFT array panel 100 and an LC layer 3 interposed therebetween.

First, the TFT array panel 100 will be described.

A plurality of gate lines 121 and a plurality of storage electrode lines 131 are formed on an insulating substrate 110 made of a material such as transparent glass or plastic.

The gate lines 121 transmit gate signals and extend substantially in a transverse direction with reference to FIG. 5. Each of the gate lines 121 includes a plurality of gate electrodes 124 projecting upward therefrom (see FIG. 5) and an end portion 129 having a large area for contact with another layer or an external driving circuit. A gate driving circuit (not shown) for generating the gate signals may be mounted on a flexible printed circuit ("FPC") film (not shown), which may be attached to the substrate 110, directly mounted on the substrate 110 or integrated with the substrate 110. The gate lines 121 may extend to be connected to a driving circuit that may be integrated with the substrate 110.

The storage electrode lines 131 are supplied with a predetermined voltage and extend substantially parallel to the gate lines 121. Each of the storage electrode lines 131 is disposed between two adjacent gate lines 121 and disposed closer to the lower of the two gate lines 121. Each of the storage electrode lines 131 includes a storage electrode 137 expanding upward and downward therefrom as illustrated in FIG. 5. However, the storage electrode lines 131 may have various shapes and arrangements.

In exemplary embodiments, the gate lines 121 and the storage electrode lines 131 are made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, they may have a multi-layered structure including two conductive films (not shown) having different physical characteristics. In exemplary embodiments, one of the two conductive films is preferably made of a low resistivity metal including an Al-containing metal, a Ag-containing metal, and a Cu-containing metal for reducing signal delay or voltage drop. The other conductive film is made of a material such as a Mo-containing metal, Cr, Ta or Ti, which has good physical, chemical and electrical contact characteristics with other materials such as indium tin oxide (ITO) or indium zinc oxide (IZO). Good examples of the combination of the two conductive films include a lower Cr film and an upper Al (alloy) film and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angles thereof range from about 30 degrees to about 80 degrees.

A gate insulating layer 140, preferably made of silicon nitride (SiNx) or silicon oxide (SiOx), is formed on the gate lines 121 and the storage electrode lines 131.

A plurality of semiconductor stripes 151, preferably made of hydrogenated amorphous silicon (abbreviated to "a-Si") or polysilicon, are formed on the gate insulating layer 140. Each of the semiconductor stripes 151 extends substantially in the longitudinal direction (see FIG. 5) and includes a plurality of projections 154 branched out toward the gate electrodes 124 and a plurality of projections 157 branched out toward the storage electrode 137 from respective projections 154. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 161 and 165, respectively, are formed on the semiconductor stripes 151. The ohmic contact stripes and islands 161 and 165 are preferably made of n+ hydrogenated a-Si heavily doped with an n-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30 degrees to about 80 degrees.

A plurality of data lines 171 and a plurality of drain electrodes 175 are formed on the ohmic contacts 161 and 165 and on the gate insulating layer 140.

The data lines 171 transmit data signals and extend substantially in the longitudinal direction to intersect the gate lines 121 and the storage electrode lines 131 as illustrated in FIG. 5. Each data line 171 includes a plurality of source electrodes 173 projecting toward the gate electrodes 124, and an end portion 179 having a large area for contact with another layer or an external driving circuit. A data driving circuit (not shown) for generating the data signals may be mounted on an FPC film (not shown), which may be attached to the substrate 110, directly mounted on the substrate 110 or integrated with the substrate 110. The data lines 171 may extend to be connected to a driving circuit that may be integrated with the substrate 110.

The drain electrodes 175 are separated from the data lines 171 and disposed opposite the source electrodes 173 with respect to the gate electrodes 124.

Each of the drain electrodes 175 includes a wide end portion 177 and a narrow end portion. The wide end portion 177 overlaps a storage electrode 137 of a storage electrode line 131 and the narrow end portion is partly enclosed by a source electrode 173.

A gate electrode 124, a source electrode 173 and a drain electrode 175 along with a projection 154 of a semiconductor stripe 151 form a TFT having a channel formed in the projection 154 disposed between the source electrode 173 and the drain electrode 175.

In exemplary embodiments, the data lines 171 and the drain electrodes 175 are made of a refractory metal such as Cr, Mo, Ta, Ti or alloys thereof. However, they may have a multilayered structure including a refractory metal film (not shown) and a low resistivity film (not shown). Good examples of the multi-layered structure include a double-layered structure including a lower Cr/Mo (alloy) film and an upper Al (alloy) film, and a triple-layered structure of a lower Mo (alloy) film, an intermediate Al (alloy) film and an upper Mo (alloy) film. However, the data lines 171 and the drain electrodes 175 may be made of various metals or conductors.

The data lines 171 and the drain electrodes 175 have inclined edge profiles, and the inclination angles thereof range from about 30 degrees to about 80 degrees.

The ohmic contacts 161 and 165 are interposed only between the underlying semiconductor stripes 151 and the overlying conductors 171 and 175 thereon, and reduce the contact resistance therebetween. Although the semiconductor stripes 151 are narrower than the data lines 171 at most places, the width of the semiconductor stripes 151 becomes large near the gate lines 121 and the storage electrode lines 131, as described above, to smooth the profile of the surface, thereby preventing disconnection of the data lines 171. The semiconductor stripes 151 include some exposed portions that are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 includes a lower passivation film 180p preferably made of an inorganic insulator such as silicon nitride or silicon oxide, and an upper passivation film 180q preferably made of an organic insulator. Preferably, the upper passivation film 180q may have a dielectric constant of less than about 4.0 and photosensitivity. The upper passivation film 180q has an embossed surface. However, the passivation layer 180 may have a single-layer structure, preferably made of an inorganic or organic insulator.

The upper passivation film 180q is removed at the end portions 129 and 179 of the gate lines 121 and the data lines 171, respectively, to expose the lower passivation film 180p.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180.

Each of the pixel electrodes 191 is curved along the embossed surface of the upper passivation film 180q, and includes a transmissive electrode 192 and a reflective electrode 194 thereon. The transmissive electrodes 192 are preferably made of a transparent conductor such as ITO or IZO, and the reflective electrodes 194 are preferably made of reflective metals such as Ag, Al, Cr or alloys thereof. However, the reflective electrode 194 may have a double-layered structure including a reflective upper film of a low-resistivity material such as Al, Ag or alloys thereof, and a lower film having a good contact characteristic with ITO or IZO such as a Mo-containing metal, Cr, Ta and Ti.

Figure 6:
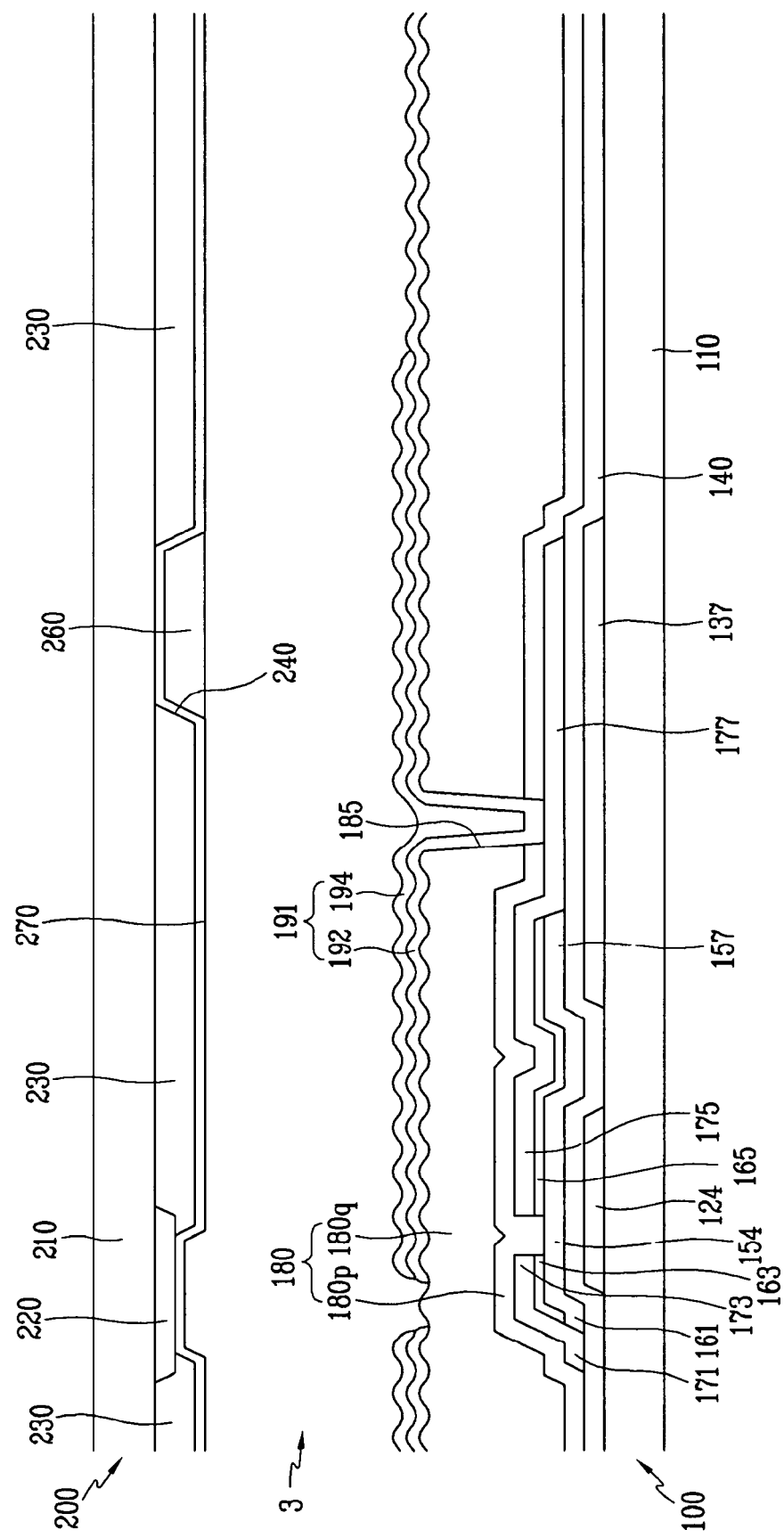
FIGS. 6 and 7 are cross-sectional views taken along the lines VI-VI and VII-VII of FIG. 5, respectively.
Figure 7:
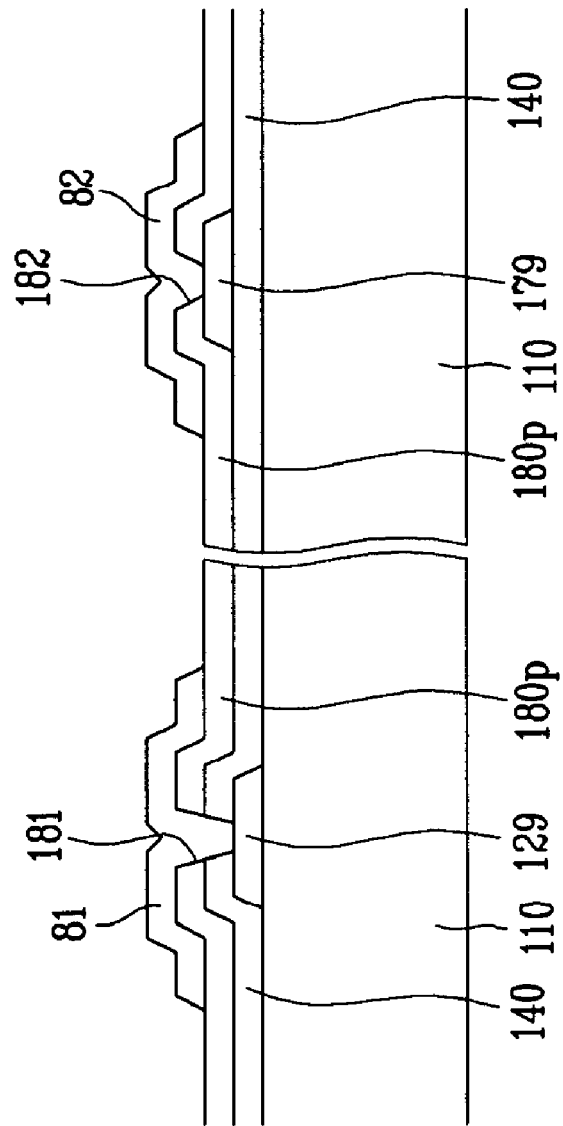

The reflective electrode 194 is disposed on a portion of the transmissive electrode 192, and thereby the remaining portion of the transmissive electrode 192 is exposed (see FIG. 6).

The pixel electrodes 191 are physically and electrically connected to the drain electrodes 175 through the contact holes 185 such that the pixel electrodes 191 receive data voltages from the drain electrodes 175. The pixel electrodes 191 that are supplied with the data voltages generate electric fields in cooperation with a common electrode 270 of the common electrode panel 200 that is supplied with a common voltage. The data voltages determine the orientations of LC molecules (not shown) of an LC layer 3 disposed between the two electrodes 191 and 270 to adjust polarization of the incident light passing through the LC layer 3.

A pixel electrode 191 and the common electrode 270 form an LC capacitor $C_{LC}$, which stores applied voltages after the TFT is turned off.

An exemplary embodiment of a transflective LCD including the TFT array panel 100, the common electrode panel 200 and the LC layer 3 according to the present invention includes a plurality of transmissive regions TA and a plurality of reflective regions RA defined by the transmissive electrodes 192 and the reflective electrodes 194, respectively. In detail, areas disposed under and over an exposed portion of a transmissive electrode 192 are transmissive regions TA, and areas disposed under and over a reflective electrode 194 are reflective regions RA.

In the transmissive regions TA, light from a backlight unit (not shown) disposed under the TFT array panel 100 passes through the LC layer 3 to display desired images. In the reflective regions RA, external light such as sunlight or ambient light that is incident thereon passes through the common electrode panel 200 and through the LC layer 3 to reach the reflective electrodes 194. Then, the external light is reflected by the reflective electrodes 194 and passes through the LC layer 3 again, to display desired images. At this time, the embossed surface of the reflective electrode 194 enhances reflective efficiency.

A pixel electrode 191 and a wide end portion 177 of a drain electrode 175 overlap a storage electrode 137 to form a storage capacitor $C_{ST}$, which enhances the voltage storing capacity of the LC capacitor $C_{LC}$.

Contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

A description of the common electrode panel 200 follows.

A light blocking member 220 is formed on an insulating substrate 210 and is made of a material such as transparent glass or plastic. The light blocking member 220 is referred to as a black matrix, and it prevents light leakage. The light blocking member 220 has a plurality of openings that face the pixels 191.

A plurality of color filters 230 are also formed on the substrate 210, and they are disposed substantially in the areas enclosed by the light blocking member 220. The color filters 230 may extend substantially in the longitudinal direction along the pixel electrodes 191. The color filters 230 may represent one of the three colors such as red, green and blue colors, and may include primary colors.

The color filters 230 of the reflective regions RA include a plurality of light holes 240.

The light holes 240 compensate a difference in color tone between the reflective regions RA and the transmissive regions TA due to the difference of a number of times the light rays are transmitted through the color filters 230. Alternatively, the difference of color tone may be compensated by differing the thickness of the color filters 230 in the transmissive regions TA and the reflective regions RA from each other, instead of forming the light holes 240.

A common electrode 270 is formed on the color filters 230 and on the light blocking members 220, and into the light holes 240. The common electrode 270 is preferably made of a transparent conductive material such as ITO or IZO.

A plurality of organic insulating films 260 are formed on the common electrode 270 into the light holes 240, to fill the light holes 240. Referring to FIG. 6, a thickness of an organic insulating film 260 is equal to that of the color filter 230, but it may be thicker or thinner than that of the color filter 230 if necessary.

Meanwhile, the reflective region RA is divided into first and second reflective regions RA1 and RA2 by a light hole 240 (see FIG. 5). The first reflective region RA1 is a region without a light hole 240, while the second reflective region RA2 has a light hole 240. Thicknesses or cell caps of the LC layer 3 in the transmissive region TA and the first and second reflective regions RA1 and RA2 are substantially equal to each other. An exposed transmissive electrode 192 and the common electrode 270 form a transmissive LC capacitor $C_{LC0}$, and a reflective electrode 194 and the common electrode 270 in the first reflective region RA1 form a first reflective LC capacitor $C_{LC1}$ (see FIG. 4).

In the second reflective region RA2, an organic insulating film 260 and a reflective electrode 192 form a second reflective LC capacitor $C_{LC2}$, and the organic insulating film 260 and the common electrode 270 form an auxiliary capacitor $C_{AUX}$.

Alignment layers (not shown) may be coated on inner surfaces of the panels 100 and 200, and polarizers (not shown) may be provided on outer surfaces of the panels 100 and 200.

The LC layer 3 is subjected to vertical alignment or horizontal alignment.

The TFT array panel 100 and the common electrode panel 200 of the LCD may be sealed by a sealant (not shown). The sealant is disposed on the boundary of the common electrode panel 200.

Next, another exemplary embodiment of LCDs according to the present invention will be described with reference to FIGS. 8 to 10.

Figure 8:
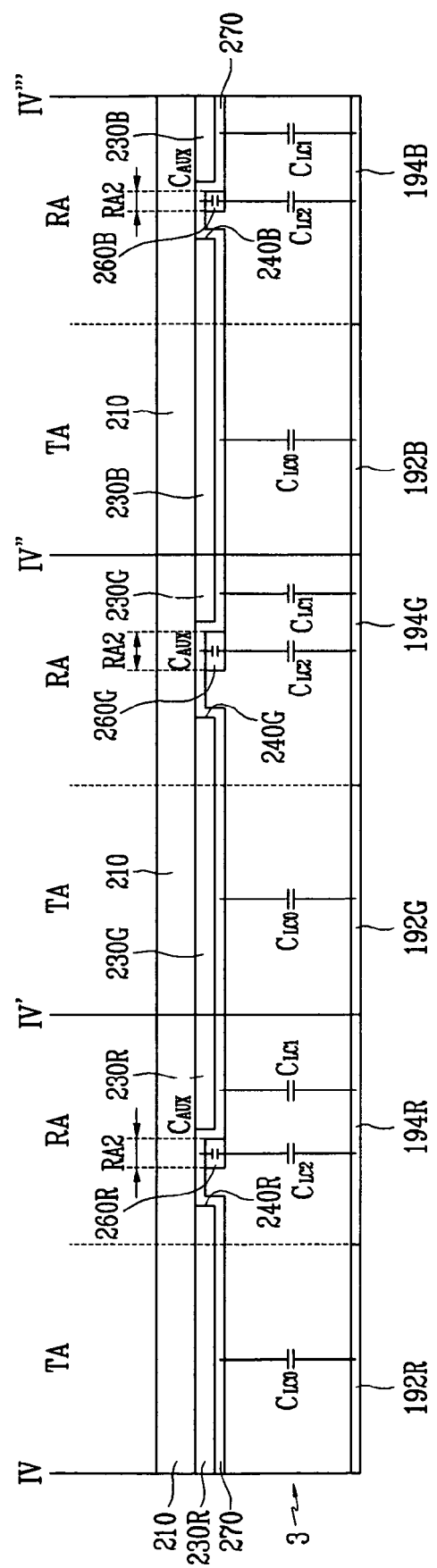
FIGS. 8 to 10 are schematic cross-sectional views of other exemplary embodiments of an LCD taken along the lines IV-IV', IV'-IV", and IV"-IV'" of FIG. 3, respectively.
Figure 9:
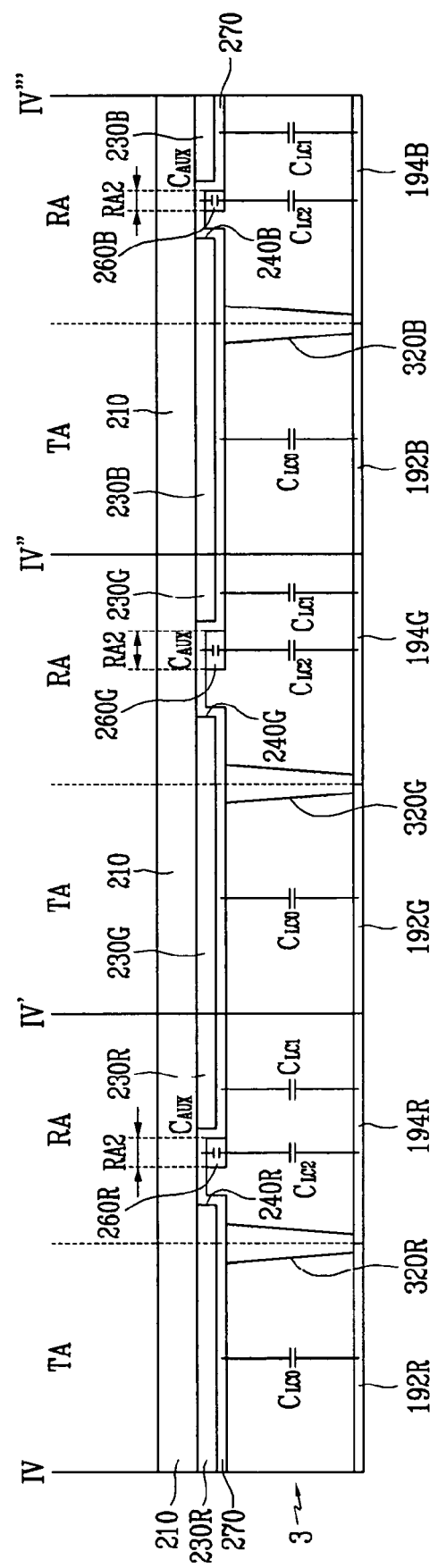
Figure 10:
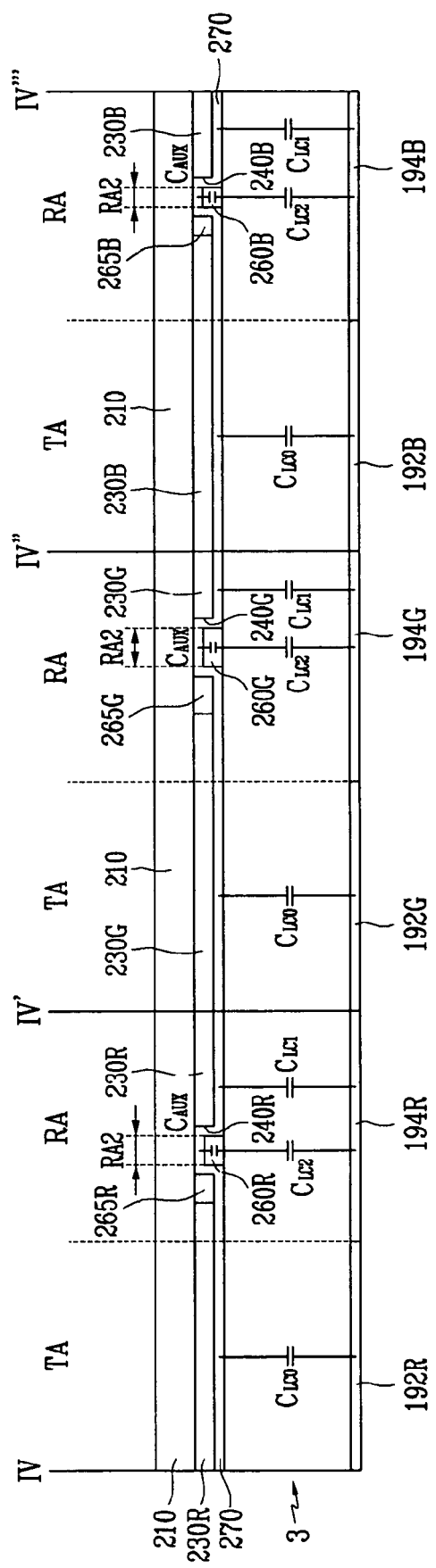

FIGS. 8 to 10 are schematic cross-sectional views of other exemplary embodiments of LCDs taken along the lines IV-IV', IV'-IV", and IV"-IV''' of FIG. 3.

Referring to FIGS. 8 to 10, layered structures of the exemplary embodiments of the LCDs according to the present invention are almost the same as that shown in FIG. 4, so the same structures and descriptions thereof may be omitted.

In an LCD shown in FIG. 8, each of a plurality of light holes 240 is divided into two parts. In one of the two parts, an organic insulating film 260 is formed on a common electrode 270, and in the other part, LC molecules of an LC layer 3 are filled therein. A first reflective LC capacitor $C_{LC1}$ is formed in the first reflective region RA1, and a second reflective LC capacitor $C_{LC2}$ and an auxiliary capacitor $C_{AUX}$ are formed in the second reflective region RA2. In this case, the second reflective region RA2 does not occupy the entire width of a light hole 240 as in FIG. 4.

In the exemplary embodiment of an LCD shown in FIG. 9, a common electrode panel 200 includes a plurality of elastic spacers 320R, 320G and 320B. The elastic spacers 320 are formed between the TFT array panel 100 and the common electrode panel 200 to form a predetermine gap therebetween. Each elastic spacer 320 may be formed by exposure to light along with the organic insulating films 260 using a half tone photo mask or a slit photo mask without additional steps. The exemplary embodiment of FIG. 9 is substantially identical to that of FIG. 8, except for the plurality of elastic spacers 320R, 320G and 320B.

In the exemplary embodiments of an LCD shown in FIG. 10, each of a plurality of light holes 240 is divided into two parts. In one of the two parts, a transparent organic insulating film 265R, 265G and 265B is formed. A common electrode 270 is formed on the transparent organic insulating films 265 of the one part, and is also formed into a light hole 240 in the other part. An organic insulating film 260 is formed on the common electrode 270 in the other part.

Of the two parts of the light hole 240, a first reflective region RA1 is the lower and upper regions of a portion at which the common electrode 270 is formed, and a second reflective region RA2 is the lower and upper regions of a portion at which the organic insulating film 260 is formed on the common electrode 270. A first reflective LC capacitor $C_{LC1}$ is formed in the first reflective region RA1, and a second reflective LC capacitor $C_{LC2}$ and an auxiliary capacitor $C_{AUX}$ are formed in the second reflective region RA2.

Different from the LCD shown in FIG. 8, in the LCD shown in FIG. 10, cell gaps in the first reflective regions RA1 having the color filters 230 are the same as those in the first reflective regions RA1 having the light holes 240, and thereby a distortion of a voltage-reflection curve in the first reflective regions RA1 is prevented.

The characteristics of the LCD shown in FIGS. 1 to 7 may be applied in the LCDs shown in FIGS. 8 to 10.

Another exemplary embodiment of an LCD according to the present invention will be described with reference to FIGS. 11 and 12.

Figure 11:
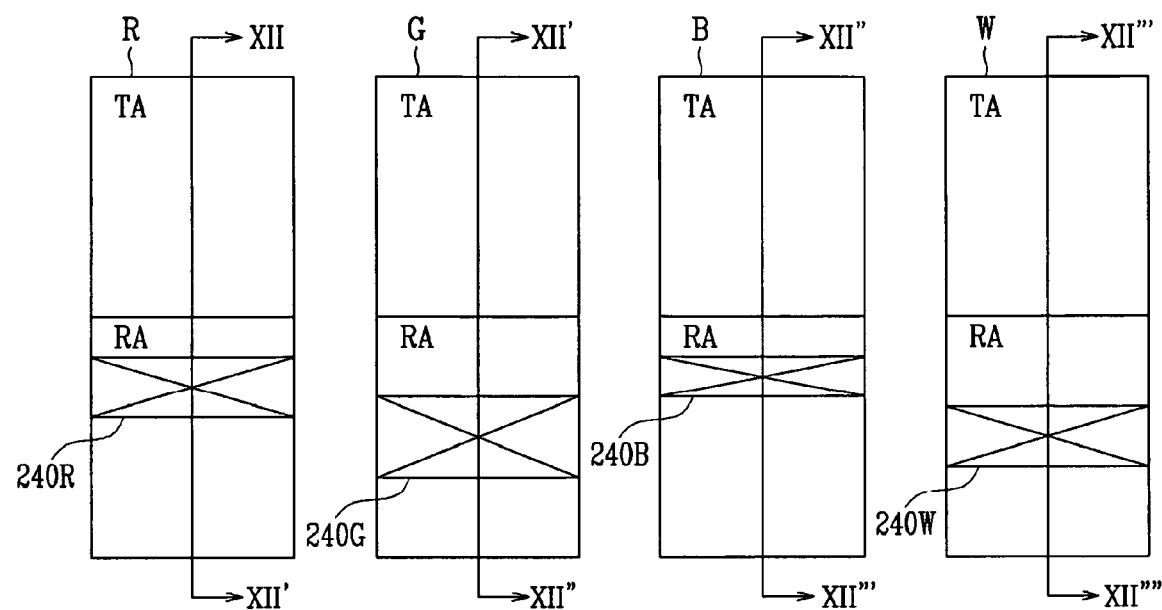
FIG. 11 is a schematic view of another exemplary embodiment of an LCD according to the present invention.

FIG. 11 is a schematic plan view of another exemplary embodiment of an LCD according to the present invention. FIG. 12 is a cross-sectional view taken along the lines XII-XII', XII'-XII", and XII"-XII''' of FIG. 11.

Figure 12:
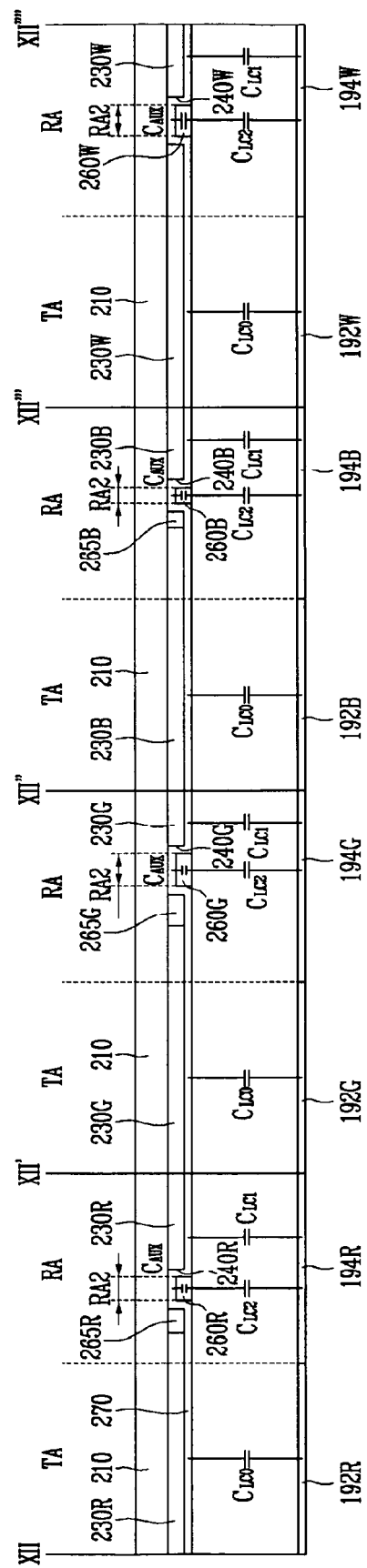
FIG. 12 is a cross-sectional view taken along the lines XII-XII', XII'-XII", and XII"-XII'" of FIG. 11.

Referring to FIGS. 11 and 12, another exemplary embodiment of an LCD according to the present invention includes a plurality of white pixels (referred to as "W pixels") as well as R, G and B pixels that are substantially the same as those of FIGS. 3 and 10, and therefore only the W pixels will be described in detail.

The basic structure of the W pixels is the same as that of the respective R, G and B pixels. That is, a TFT array panel includes a plurality of transmissive electrodes 192W and a plurality of reflective electrodes 194W. A common electrode panel includes a plurality of transparent color filters 230W on an insulating substrate 210. Each of the transparent color filters 230W includes a plurality of light holes 240W. A common electrode 270 is formed on the transparent color filters 230W and into the light holes 240W. A plurality of organic insulating films 260W are formed on the common electrode 270 which is formed into the light holes 240W. The organic insulating films 240W are filled into the light holes 240W to provide a plane surface to the common electrode panel and to function as a dielectric of auxiliary capacitors $C_{AUX}$.

The color filters 230W of the W pixels are made of a photoresist ("PR") without pigments. In the exemplary embodiment of the present invention, the light holes 240W of the W pixels are used to compensate color tone rather than to form the auxiliary capacitors $C_{AUX}$.

By adding the W pixels, luminance of the LCD is enhanced compared to the LCD having only the R, G and B pixels, without enlarging the total size of a dot (a basic unit representing a color).

In FIG. 11 the R, G, B and W pixels are arranged in a stripe shape, but alternatively the R, G, B and W pixels may be arranged in various shapes such as a matrix shape of 2×2. The size of a W pixel may be equal to or smaller than that of each of the R, G and B pixels. Furthermore, each of the R, G, B and W pixels is a different size. An order of the R, G, B, and W pixels may also be varied.

Various characteristics of the LCD shown in FIGS. 1 to 10 are the same as the LCD shown in FIGS. 11 and 12.

The manufacturing method of the common electrode panel of the LCD shown in FIGS. 11 and 12 will be described with reference to FIGS. 13 to 21.

FIGS. 13 to 21 illustrate an exemplary embodiment of a method of manufacturing a common electrode panel of the LCD shown in FIGS. 11 and 12.

A light blocking member (not shown) referred to as a black matrix is formed on an insulating substrate 210. The light blocking member is formed by patterning a Cr layer or a double-layer made of Cr and a Cr oxide.

Figure 13:
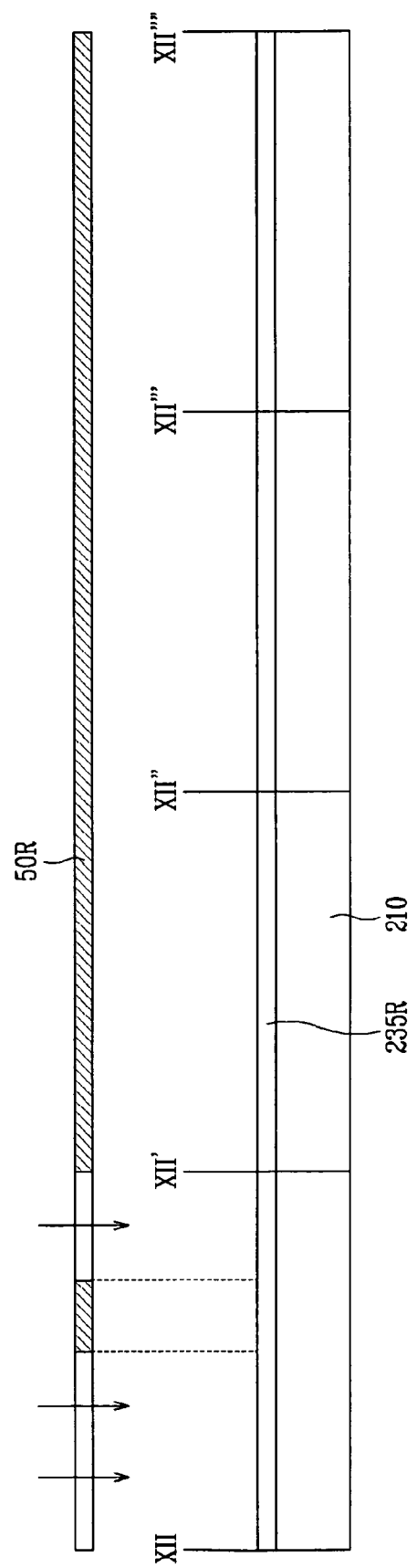
FIGS. 13 to 21 illustrate an exemplary embodiment of a manufacturing method of a common electrode panel of the LCD shown in FIGS. 11 and 12.
Figure 14:
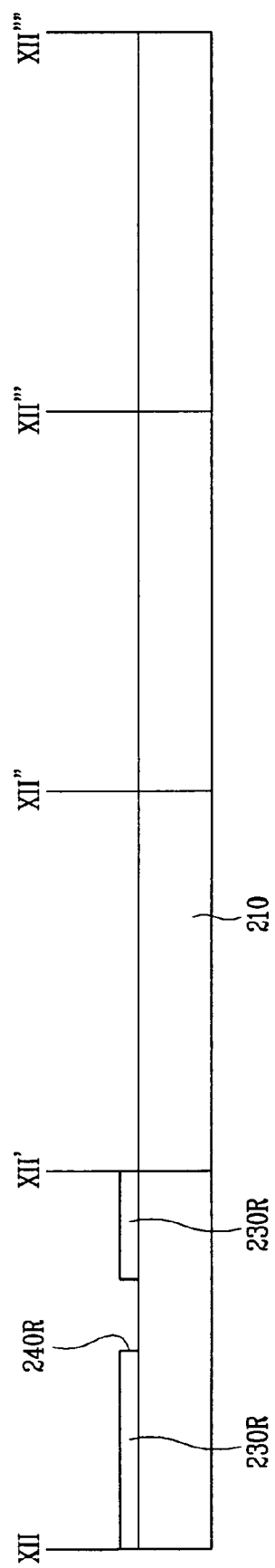
Figure 15:
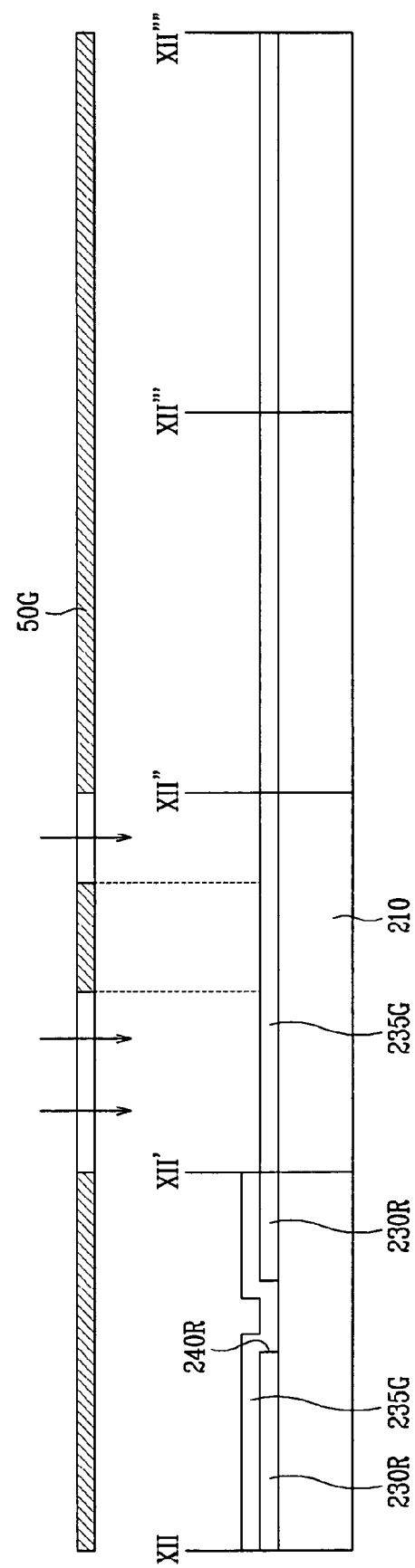
Figure 16:
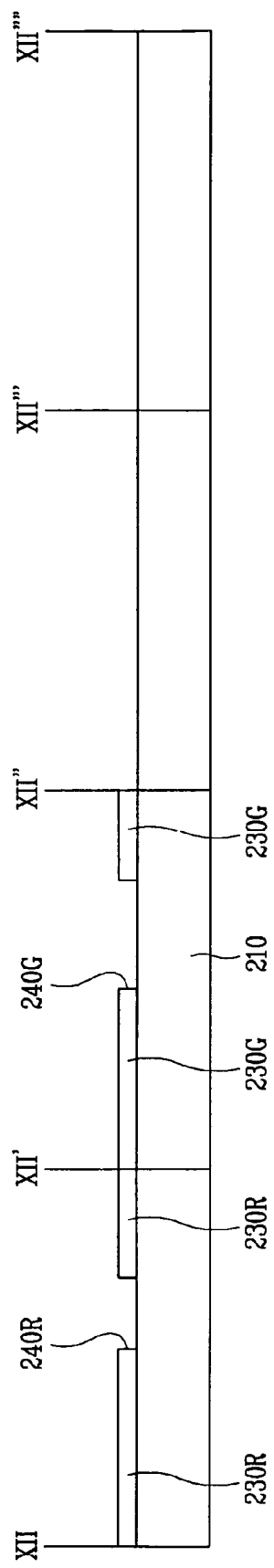

Then, as shown in FIG. 13, a color PR 235R including a red (R) pigment is applied on the light blocking member and the substrate 210 by spin coating or roll coating, and then the color PR 235R is exposed to light and developed by using a mask 50R having a desired pattern. By baking after the developing, red color filters 230R and light holes 240R are formed as shown in FIG. 14. The color PR 235R is a negative PR in which portions that have been exposed to light are not dissolved by a developer, and thereby portions not exposed to light are removed by the developer.

Again referring to FIGS. 15 and 16, a color PR 235G including a green (G) pigment is applied to the substrate 210 formed with the red color filters 230R, and then exposing and developing are performed while using a mask 50G. By subsequent baking, color filters 230G and light holes 240G are formed. The color PR 235G is a negative PR.

Figure 17:
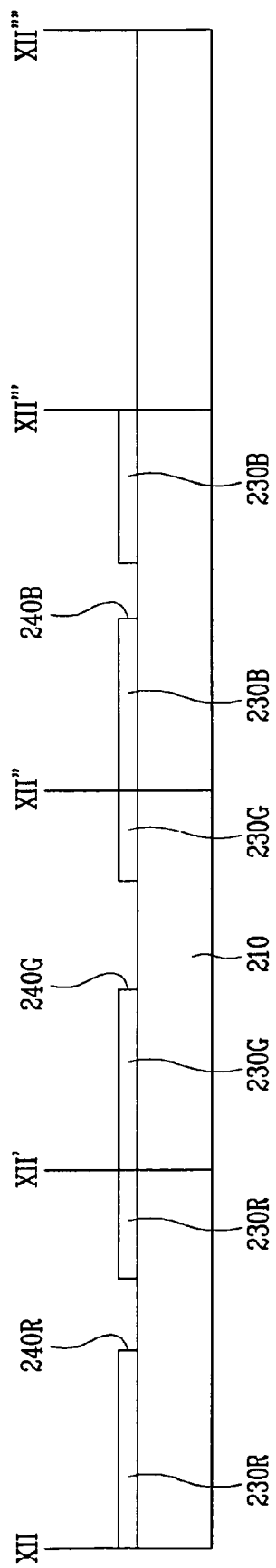

In the same manner as for the red color filters 230R and the green color filters 230G, blue color filters 230B and light holes 240B are formed as illustrated in FIG. 17.

Figure 18:
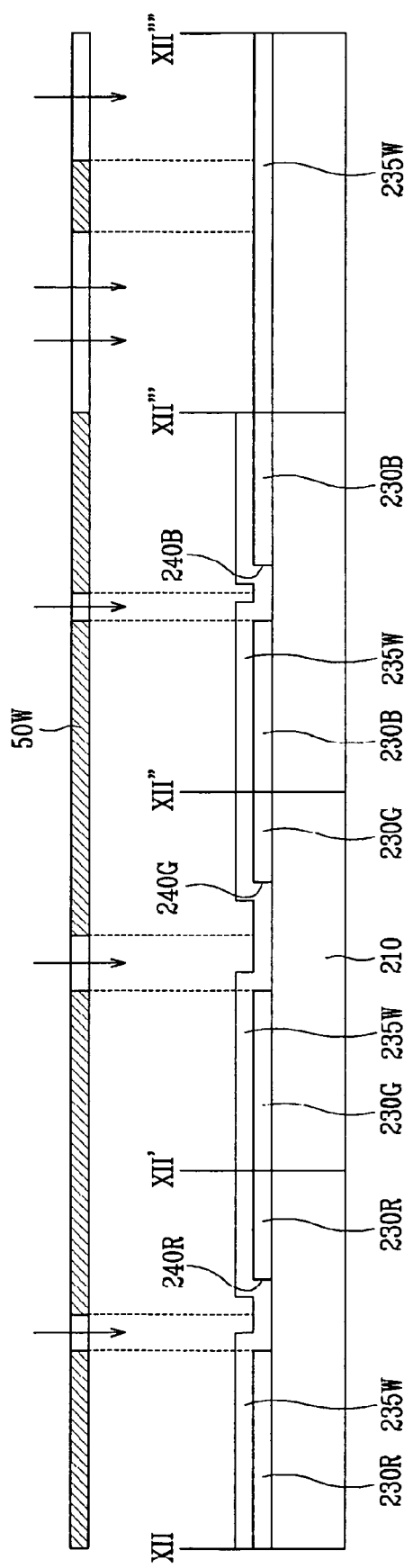
Figure 19:
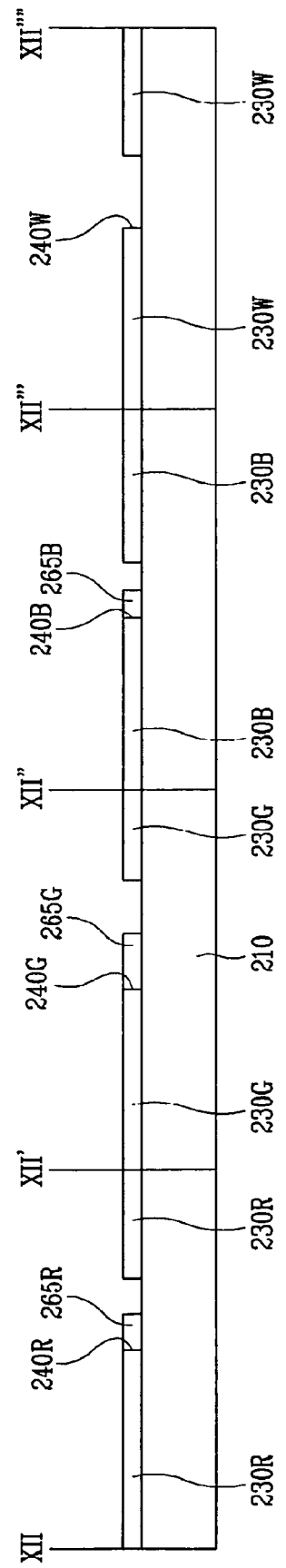

As shown in FIG. 18, a transparent PR 235W without a pigment is applied on the substrate 210 formed with the color filters 230R, 230G and 230B. Then, the transparent PR 235W is exposed to light and developed by using a mask 50W. At this time, light is irradiated in a portion of the respective light holes 204R, 240G and 240B of the respective R, G and B pixels through the mask 50W, to leave the transparent PR 235W. After the baking, as shown in FIG. 19, transparent organic films 265R, 265G and 265B are formed into the light holes 240R, 240G, and 240B, respectively, to form the transparent color filter 230W.

Figure 20:
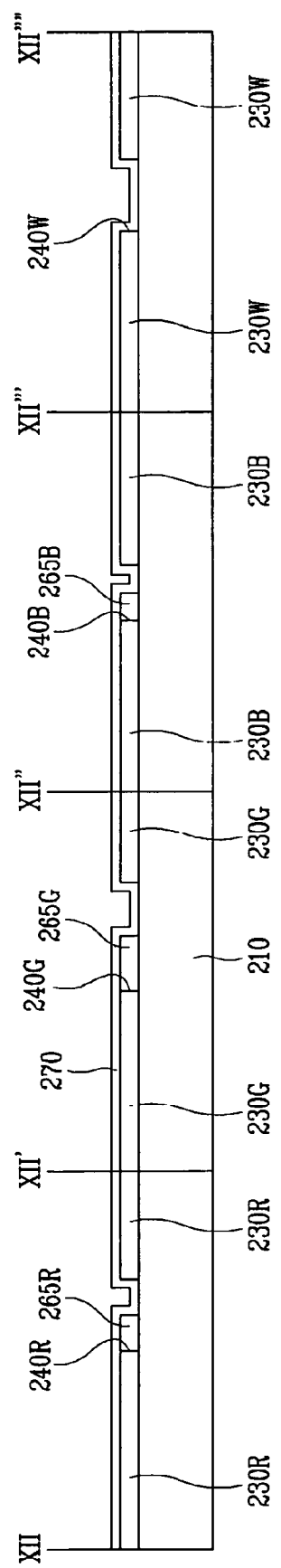

As shown in FIG. 20, a common electrode 270 is formed on the color filters 230R, 230G, 230B and 240W and the transparent organic films 265R, 265G and 265B, and into the light holes 240R, 240G, 240B and 240W that are not filled with the transparent organic films 265R, 265G and 265B.

Figure 21:
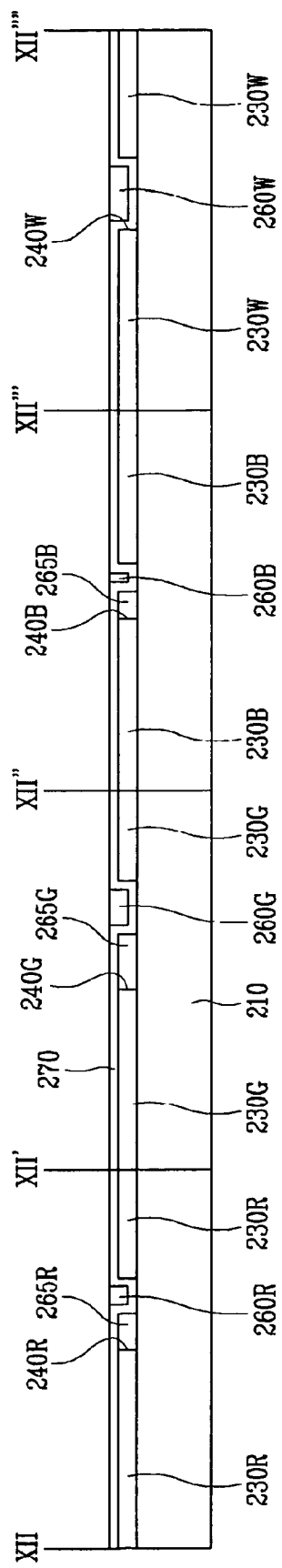

Referring to FIG. 21, organic insulating films 260R, 260G, 260B and 260W are formed on the common electrode 270 that is dented along the light holes 240R, 240G, 240B and 240W of the respective R, G, B and W pixels. A thickness of each of the organic insulating films 260R, 260G, 260B and 260W may be adjusted through a photoetching process using a slit mask, for example, but is not limited thereto.

When the size of the respective light holes 240R, 240G and 240B of the respective R, G and B pixels are equal to each other, the color filters 230R, 230G and 230B may be formed by shifting one mask and exposing it to light.

Figure 22:
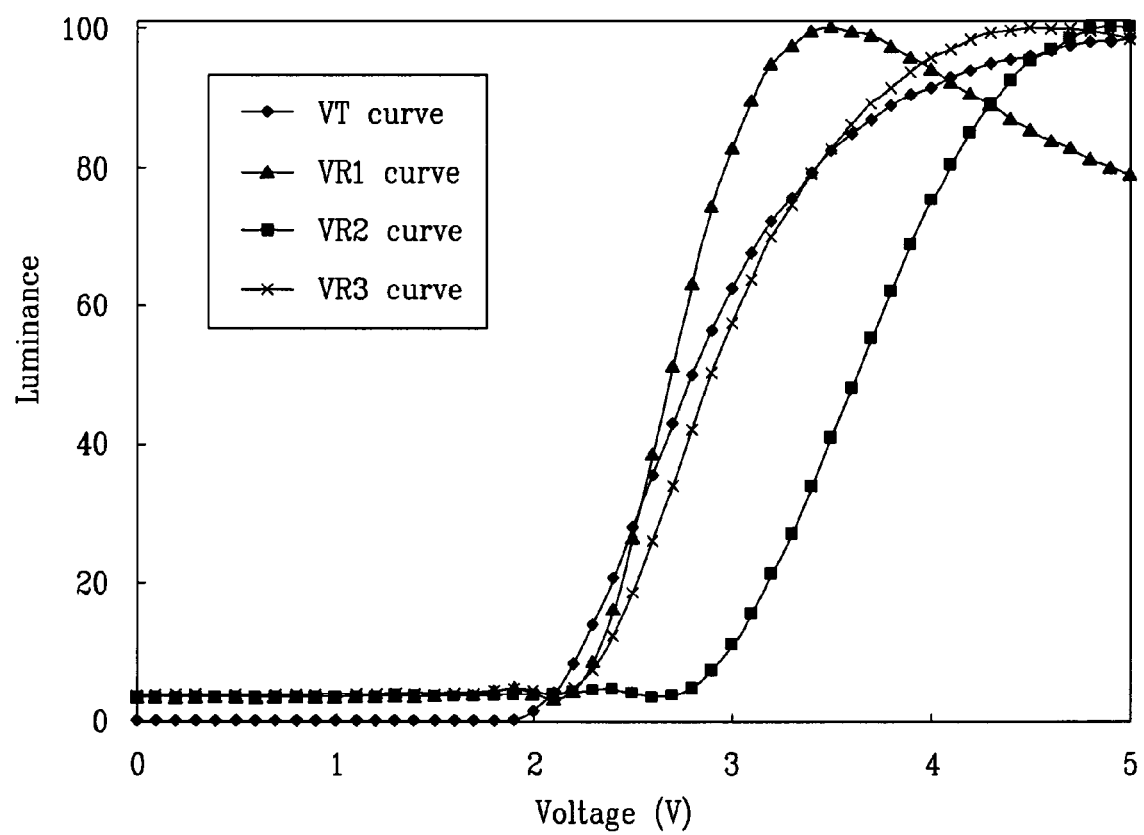
FIG. 22 is a graph illustrating voltage-reflection curves and voltage-transmittance curves of the LCD shown in FIG. 10.

A simulation result with voltage-transmittance and voltage-reflection curves of the LCD shown in FIG. 10 will be described with reference to FIG. 22.

The voltage-transmittance curve VT represents variation of luminance in the transmissive region TA with respect to variation of the pixel voltage V. The first and second voltage-reflection curves VR1 and VR2 respectively represent variation of luminance in the first and second reflective regions RA1 and RA2 with respect to variation of the pixel voltage V. The third voltage-reflection curve VR3 is obtained by synthesizing the first voltage-reflection curve VR1 and second voltage-reflection curve VR2, and it represents variation of luminance in the total reflective region RA (first and second reflective regions RA1 and RA2) with respect to variation of the pixel voltage V.

Simulations were performed until the third voltage-reflection curve VR3 became close to the voltage-transmittance curve VT by varying an area ratio AR and a voltage ratio k. The area ratio AR is an area ratio of the first reflective region RA1 and the second reflective region RA2 in the light holes 240, and the voltage ratio k is a voltage ratio across the first reflective LC capacitor $C_{LC1}$ and the second reflective LC capacitor $C_{LC2}$.

According to simulation results, when the area ratio AR was 0.4:0.6 to 0.6:0.4 and the voltage ratio k was 1:0.6 to 1:0.9, the third reflection curve VR3 became similar to the voltage-transmittance curve VT. As an example of the results, FIG. 22 showed a third voltage-reflection curve VR3 when the area ratio AR was 1:1 and the voltage ratio k was 1:0.8. As show in FIG. 22, the third voltage-reflection curve VR3 became close to the voltage-transmittance curve VT.

As described above, by adjusting the area ratio AR and the voltage ratio k, the third voltage-reflection VR3 is obtained, which is close to the voltage-transmittance curve VT.

According to the present invention, each reflective region is divided into two sub-regions. A data voltage is applied to one of the two sub-regions and a voltage that is lower than the data voltage is applied to the other sub-region. Thereby, an LCD having gamma curves of the reflective mode and the transmissive mode coinciding with each other and having a substantially uniform cell gap is provided.

Although exemplary embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A common electrode panel having a plurality of pixel areas, comprising:
a substrate;
a plurality of color filters formed on the substrate and disposed in each of the pixel areas respectively, each of the color filters having a respective light hole formed therein;
a common electrode formed on the color filters and into the light holes; and
a first insulating film formed on the common electrode and formed into each of the light holes.

2. The common electrode panel of claim 1, wherein the light hole is divided into two regions, and the first insulating film is formed on one of the two regions.

3. The common electrode panel of claim 2, further comprising a second insulating film formed into the light holes and wherein the common electrode is formed on the second insulating film in at least the other of the two regions.

4. The common electrode panel of claim 3, wherein the first and second insulating films comprise an area ratio of 0.4:0.6 to 0.6:0.4.

5. The common electrode panel of claim 3, wherein the color filters comprise a transparent color filter formed along with the second insulating film.

6. The common electrode panel of claim 5, wherein the second insulating film and the transparent color filter are formed by a negative photoresist.

7. The common electrode panel of claim 1, wherein the color filters represent one of at least three colors or are transparent.

8. The common electrode panel of claim 7, wherein the light holes of the color filters representing the at least three colors are each of different sizes.

9. The common electrode panel of claim 1, further comprising an elastic spacer formed on the common electrode.

10. The common electrode panel of claim 9, wherein the elastic spacer is formed along with the first insulating film, the elastic spacer extends from the common electrode from the common electrode to a thin film transistor (TFT) panel facing the common electrode panel.

11. A liquid crystal display having plurality of pixel areas, comprising:
a common electrode panel having a first substrate, a color filter formed on the substrate, disposed in each of the pixel areas respectively, and having a respective light hole formed therein, a common electrode formed on the color filter and into the light hole, and a first insulating film formed on the common electrode formed into the light hole;

a thin film transistor (TFT) panel facing the common electrode panel; and a liquid crystal layer interposed between the common electrode panel and the TFT panel, wherein the TFT panel comprises a second substrate, a transmissive electrode formed on the second substrate, and a reflective electrode formed on the second substrate and connected to the transmissive electrode.

12. The liquid crystal display of claim 11, wherein the light hole is formed over the reflective electrode.

13. The liquid crystal display of claim 11, wherein the common electrode formed into the light hole and the reflective electrode have an interval therebetween that is larger than that an interval between the common electrode and the reflective electrode formed on the color filter.

14. The liquid crystal display of claim 11, wherein the reflective electrode is formed on the transmissive electrode and has an embossed curved surface.

15. A manufacturing method of a common electrode panel of a transflective liquid crystal display, comprising:

forming a light blocking member on a substrate;

forming color filters on the substrate;

forming a respective light hole in each of the color filters;

forming a common electrode on the color filters and into the light holes; and forming first insulating films on the common electrode and into the light holes.

16. The manufacturing method of claim 15, wherein the light hole is divided into two regions, and the first insulating films are formed on one of the two regions.

17. The manufacturing method of claim 15, wherein the formation of the common electrode further comprises forming second insulating films into the light holes and forming the common electrode on the second insulating films.

18. The manufacturing method of claim 15, wherein the formation of the first insulating films comprises forming an elastic spacer on the common electrode along with forming the first insulating films.

19. The manufacturing method of claim 18, wherein the elastic spacer extends from the common electrode to a thin film transistor (TFT) panel facing the common electrode panel.

20. The manufacturing method of claim 15, wherein the formation of the color filters and the light holes comprises:

sequentially forming color filters representing at least three colors, and light holes; and forming the second insulating films into the light holes along with the formation of a transparent color filter.

21. The manufacturing method of claim 20, wherein the transparent color filter and the second insulating films are formed by a negative photoresist.

* * * * *